March 28, 1961 P. GRAHAM 2,977,135
VEHICLE OCCUPANT SAFETY BARRIER
Filed May 31, 1957 3 Sheets-Sheet 1
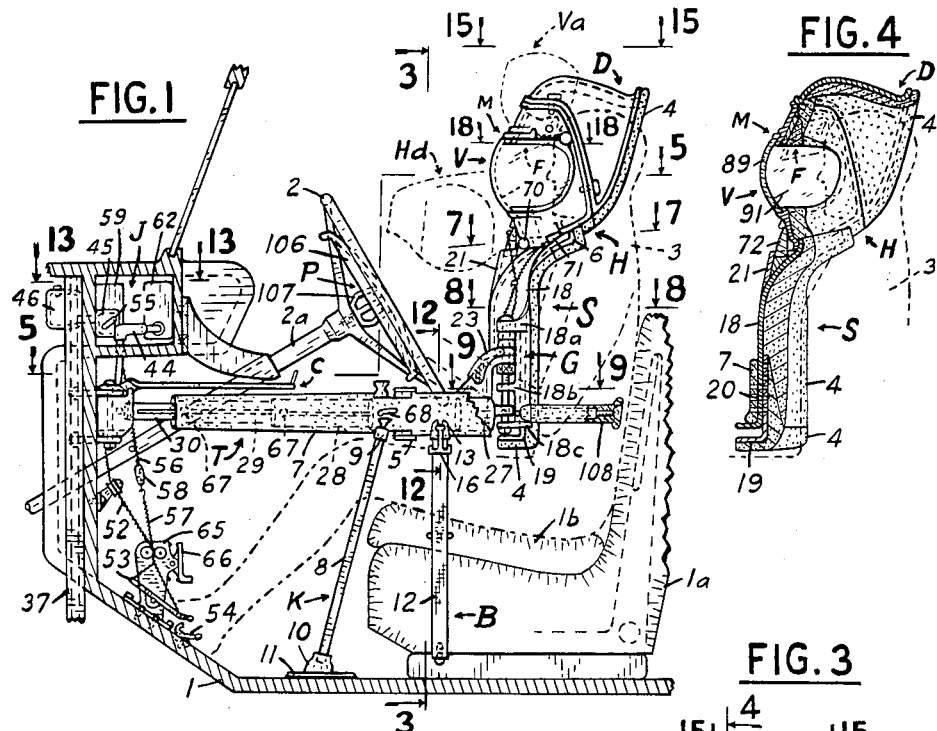
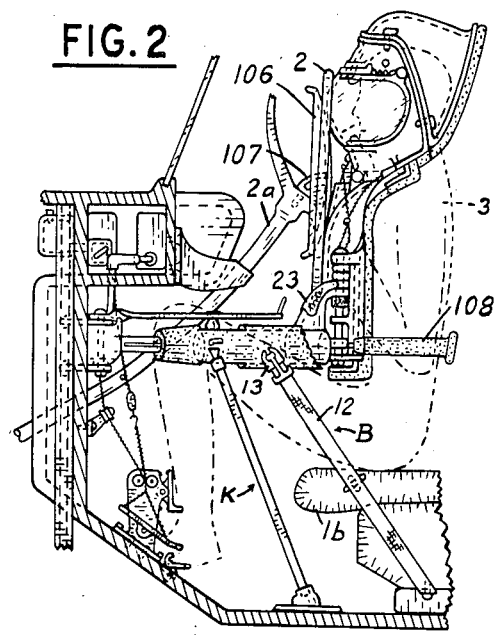
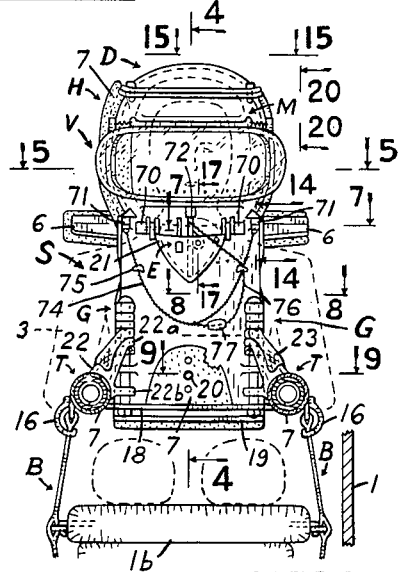
INVENTOR.
PHILLIP GRAHAM
BY
*William J. Ruano*
ATTORNEY

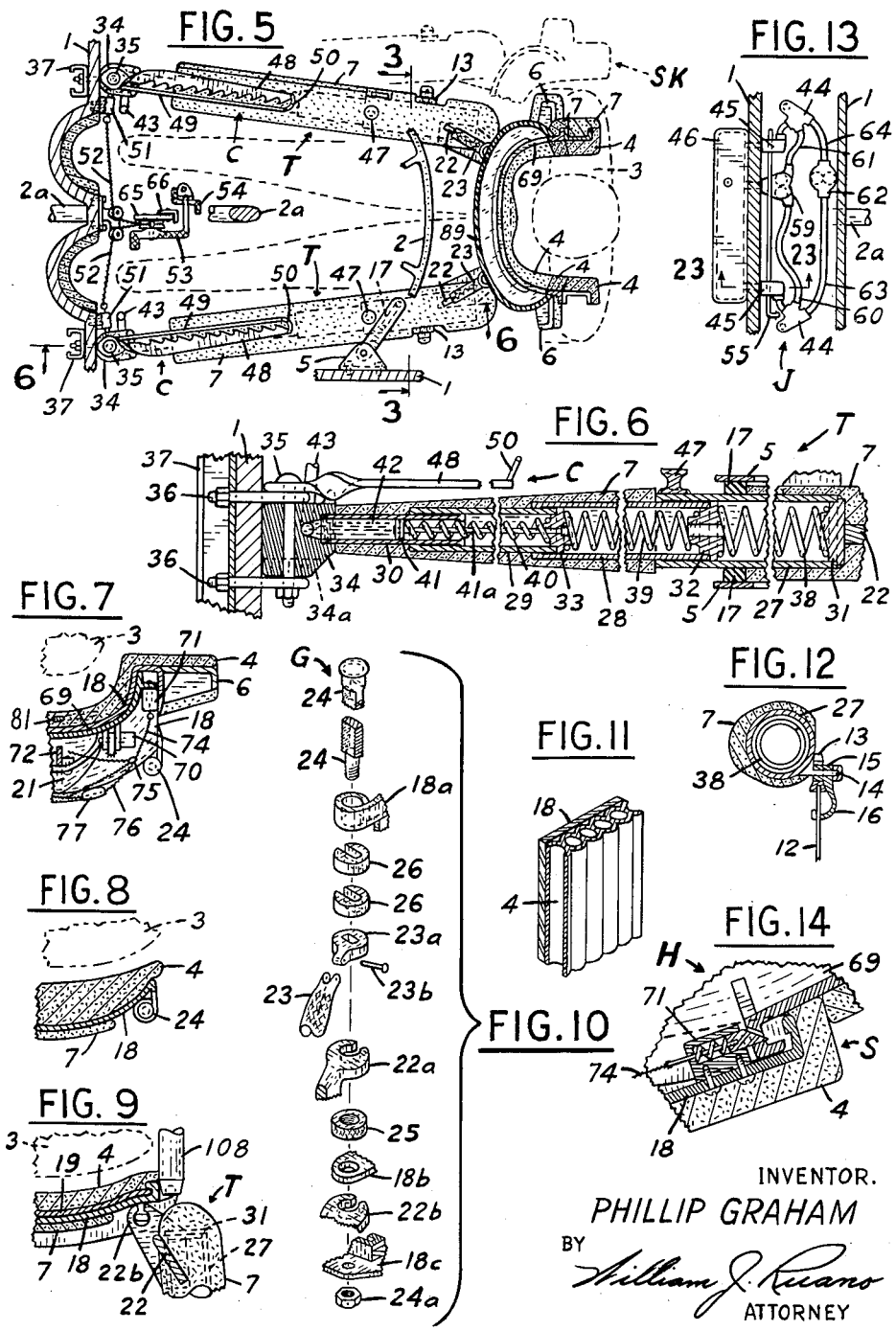

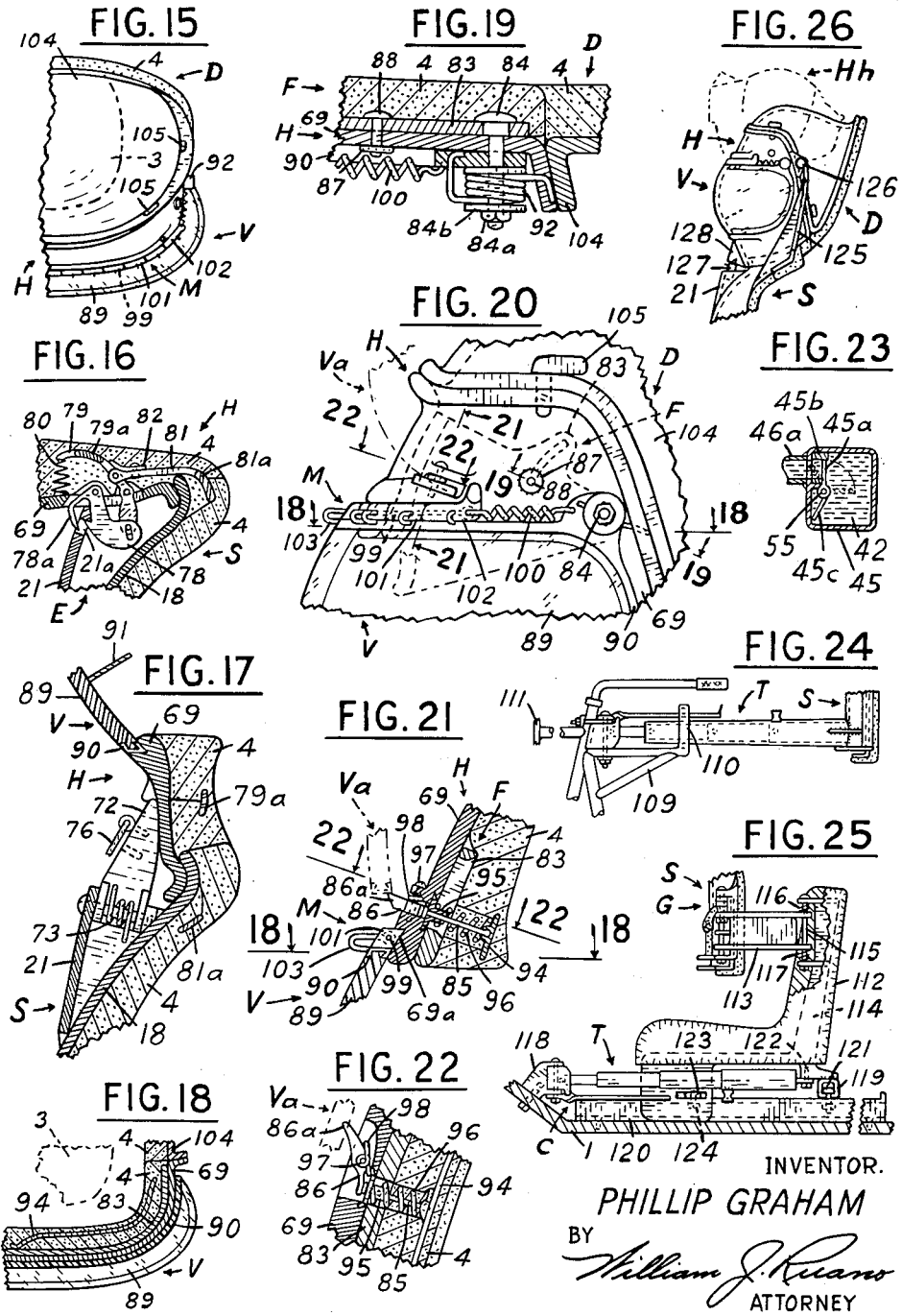

United States Patent Office 2,977,135
Patented Mar. 28, 1961

2,977,135

VEHICLE OCCUPANT SAFETY BARRIER

Phillip Graham, 2825 Glenmore Ave., Pittsburgh 16, Pa.

Filed May 31, 1957, Ser. No. 662,770

15 Claims. (Cl. 280—150)

This invention relates to a safe conveyance barrier that is positioned closely in front of an occupant of a conveyance to protect him during a collision. More particularly, it relates to a cushioning barrier that may be positioned in an automobile between the operator and the steering wheel or the like to maintain protection for the operator while allowing him freedom of movement in driving, including driving throughout an accident period when the auto remains controllable. The barrier is mounted so it need not touch the occupant except during a collision. This invention is an improvement over my copending application, Serial No. 532,440, filed September 6, 1955, entitled Curved Barrier for Vehicles, now U. S. Patent No. 2,827,305.

The invention may be described in general terms as follows. The barrier has means to act during a collision, including a very violent collision, to adequately cushion an occupant when he is propelled against it by momentum. The barrier also confines the occupant to prevent the momentum from throwing him against rigid portions of the conveyance and the like. The barrier provides stiff shielding and has large cushioning surfaces that become bearing surfaces against the occupant's body during a collision. The large bearing area allows a low bearing pressure to safely transmit the body momentum force into the barrier, the barrier yielding to an extent as the force is absorbed. There is means to prevent objectionable rebounding of the barrier against the occupant. The barrier has other safety features including means operative during a very violent collision to cause the momentum force of the operator's body to be harnessed to the barrier to force it to act as a battering ram to bend the steering wheel, steering column, and other such rigid objects to provide a longer path in which the operator can decelerate slower and thus safer by reducing the intensity of the bearing pressure of his body against the barrier. The low bearing pressure is particularly needed to prevent internal injuries, including brain injuries, since brain injuries can be caused by impact pressures that are only half as strong as those that cause skull fractures.

There is an urgent need for such safety barriers, since their use would materially reduce the toll of casualties in auto accidents. Hundreds of auto occupants are killed and thousands are permanently maimed every week. There will probably be much greater need of such safety means in autos and the like in the near future as it is likely that much higher auto driving speeds will necessarily be permitted to increase the flow of traffic on open highways, and thus increase the capacity of the roads.

During violent auto collisions, the involved operators are usually thrown against the narrow steering wheel members, the dash board and the windshield. The upper portion of an operator's body usually pivots downwardly during a collision. Such movements usually cause the head and chest to strike the steering wheel, causing serious injuries. Common safety means that do not restrain the driver from pivoting downward lack the means to allow the driver to maintain control of the auto to steer it after it caroms during an accident.

Conventional auto safety belts and the like give only limited protection to the average operator during a very violent collision since they do not prevent the upper portion of the operator's body from pivoting downwardly against the steering wheel, also the belt does not yield much during a violent deceleration, thus the driver's body is decelerated quickly with little cushioning, causing serious internal injury or death due to the great intensity of the body pressure against the narrow belt. Common safety belts do not confine the operator's head to prevent it from pivoting forwardly and downwardly due to momentum forces. A large portion of auto collision fatalities is due to head injuries. Safety belts with shoulder straps bind the vehicle occupant, limit his freedom of movement. Because of these objectionable features, they are not likely to be acceptable to the general public, also such belts do not confine the occupant's head to prevent it from pivoting downwardly. Common crash helmets that are used by racing car drivers are too confining and uncomfortable to be worn for long periods and they offer very limited cushioning. Transparent visors that are used by racing car drivers do not have enough cushioning means to adequately protect the average driver against injury during a violent collision.

The curved barriers described in my U.S. Patents No. 2,826,788 and No. 2,827,305 that are positioned in front of the steering wheel offer limited protection to the operator from the common type steering wheel and steering column. Also those barriers do not confine the driver to prevent him from being thrown towards the ceiling or sideways during an accident.

Conveyance safety barrier, such as those described in the present application, can be readily mounted in common autos to furnish a much greater degree of protection to the occupants than is possible with common safety belts and the like. Furthermore, the barriers can be built into autos which have safe bodies, such as those described in my Patent No. 2,916,324, entitled "Safe Conveyance Body," to protect the occupants to a considerable degree, even when the vehicles crash when traveling at ultra high speeds. Although the conveyance barrier is shown as being incorporated into an automobile, it may be incorporated into other conveyances, including trucks, aircraft, military tanks, speedboats, snow sleds, and the like. Furthermore, although I have illustrated the barrier as it would be positioned in protecting the operator of a conveyance, such barriers may also be positioned in front of passengers.

An object of my invention is to provide a shield-like conveyance safety barrier that is mounted on the conveyance closely in front of an occupant to adequately cushion and confine him in an upright position, to protect him during a very violent collision, and to protect him after the collision impact by preventing objectionable rebounding of the barrier against him.

Another object of my invention is to provide a cushionable conveyance safety barrier that is positioned and mounted on the conveyance closely in front of an operator, that allows the operator to drive freely while maintaining adequate protection for him in case of a collision or rapid deceleration, and that confines his body to maintain it in an upright position for driving through the collision period.

Another object is to provide a cushionable conveyance safety barrier that is positioned and mounted on the conveyance closely in front of the operator, to harness the operator's momentum during a collision, to cause the barrier to act as a battering ram and to bend the steering wheel and steering column to clear a path to obtain a longer period in which to decelerate the operator's body during a collision.

Another object of my invention is to provide a cushioning conveyance barrier that is mounted on the conveyance in front of the operator, the barrier having a head shield which may have a visor. The head shield may be pivotably mounted to allow it to be kept in a lowered position away from the head until a dangerous traffic condition occurs. Then a control may tripped to cause the head shield to pivot upwardly to position it so as to protect the occupant's head.

A further object is to provide a cushioning conveyance barrier that is mounted on the conveyance in front of an occupant. The barrier may be readily skewed laterally to allow a collision thrust from an angle to be taken more directly to obtain the most protection against the impact of the collision.

A still further object is to provide a cushioning conveyance barrier that is mounted on the conveyance in front of an occupant, the barrier having a shield that can be quickly moved back towards the body of the occupant to start the cushioning action sooner so the body will be safely decelerated before reaching the vicinity of the rigid dash framing and the like.

Other objects and advantages of the invention will become more apparent from a study of the following description taken with the accompanying drawings wherein:

Figure 1 is a side elevational sectional view showing the barrier positioned in front of the operator of an automobile;

Figure 2 is a view similar to Figure 1, except that it shows the barrier acting to cushion the operator during a collision;

Figure 3 is a sectional view taken along line 3—3 of Figs. 1 and 5;

Fig. 4 is a sectional view taken along line 4—4 of Fig. 3;

Figure 5 is a sectional view taken along line 5—5 of Figs. 1 and 3;

Figure 6 is an enlarged, sectional view taken along line 6—6 of Fig. 5;

Figure 7 is an enlarged, fragmentary, sectional view taken along line 7—7 of Figs. 1 and 3;

Figure 8 is an enlarged, fragmentary, sectional view taken along line 8—8 of Figs. 1 and 3;

Figure 9 is an enlarged, fragmentary, sectional view taken along line 9—9 of Figs. 1 and 3;

Figure 10 is an enlarged, fragmentary, exploded isometric view showing details of a hinge for a thrust arm;

Figure 11 is an enlarged, fragmentary, sectional isometric view showing a fragment of cushionable lining for the shielding;

Figure 12 is an enlarged, sectional view taken along line 12—12 of Fig. 1;

Figure 13 is a fragmentary, sectional view taken along line 13—13 of Fig. 1;

Figure 14 is an enlarged, fragmentary, sectional view taken along line 14—14 of Fig. 3;

Figure 15 is an enlarged, fragmentary plan view taken along line 15—15 of Figs. 1 and 3;

Figure 16 is an enlarged, fragmentary, elevational, sectional view showing a latch that is holding down the head shield;

Figure 17 is an enlarged, fragmentary, sectional view taken along line 17—17 of Fig. 3;

Figure 18 is an enlarged, fragmentary, sectional view taken along line 18—18 of Figs. 1, 20, and 21;

Figure 19 is an enlarged, fragmentary, sectional view taken along line 19—19 of Fig. 20;

Figure 20 is an enlarged, fragmentary, elevational view taken along line 20—20 of Fig. 3;

Figure 21 is an enlarged, fragmentary, sectional view taken along line 21—21 of Fig. 20;

Figure 22 is an enlarged, fragmentary, sectional view taken along line 22—22 of Figs. 20 and 21;

Figure 23 is an enlarged, sectional view taken along line 23—23 of Fig. 13;

Figure 24 is a side, elevational view showing a modification of the barrier shown in Fig. 1;

Figure 25 is a side, elevational view showing another modification of the barrier shown in Fig. 1;

Figure 26 is a side, elevational view showing a modification of the barrier shown in Fig. 1.

Referring more particularly to the drawings, Figures 1 to 23 inclusive show a shield-like cushionable safety barrier that is mounted on an automobile body 1 between the steering wheel 2 and the operator 3. The relationship between the barrier and the operator 3 is shown in Figs. 1 to 5 inclusive. During a violent collision, the operator would be thrown forward from his position shown in Figure 1 to a position like that shown in Figure 2. The barrier is positioned so that it automatically protects the operator without restricting his freedom of movement to drive, thus it causes him to feel relatively safe while driving. Therefore, he can remain at the controls of the auto in the face of a crash and concentrate on trying to avoid crashing rather than abandon the controls and try to shield his head with his arms, or try to gain a prone position on the seat. The barrier does not bind the operator, thus he can quickly escape from behind it when there is a fire hazard or the like after an accident. An operator who is indifferent to safety precautions cannot readily circumvent the barrier's protective features. The barrier can be used to a large extent to protect the driver without obscuring more than the front of his torso and such obscuring would only be against those persons who are confronting him. Since the barrier does not touch the operator except during a collision, it would not chafe him or wrinkle his clothes.

The barrier is symmetrical except for minor features that are described further on. The barrier has a strong rigid shield S that shields the front of the operator's torso. The shield S would not be an objectionable obstruction when it is positioned in front of an operator of average size, since the space filled by the shield S would be even less than the space which would be filled by excess flesh on the front of the torso of a very fat operator. Operators who are extremely fat or short in stature can sit back of the barrier and drive by using pedals that are extensible, or like adjustable controls.

A pair of cushioning thrust arms T are connected to the shield S with a pair of hinges G. The arms T are fastened to the firewall of the auto body 1 with hinges. The pin of a hinge G may be quickly turned ninety degrees to disengage a side of the shield S from the adjacent arm T. There are springs in the arms T that absorb most of the thrust of the operator's body that is thrown against the shield S during a collision. Catches C prevent objectionable rebounding of the shield S against the operator. A pair of posts K help to support the arms T. A head shield H is attached to the upper portion of the shield S with hinges and latching means. A hood D is shown attached to the head shield H. The hood D may be quickly removed when the driver prefers to drive without its protection, or when driving conditions are not severe enough to warrant its protection. A visor-like forehead shield F is hinged to the inside of the head shield H. The shield F is useful as a sunshade and as an adjustable shield to cushion and protect the forehead of an operator. The shield S, head shield H, hood D, and the forehead shield F have cushioning lining or padding 4 which is attached to the surfaces that are adjacent to the operator 3. The cushion 4 is made as thin as practical, with sufficient thickness to allow it to be compressed slightly by the momentum force after it yields and bulges to conform closely to the shape of the contacting portion of the operator's body that bears against it during a collision. The cushioning 4 may be an inflated, thin mattress-like member, such as that shown in Fig. 11, which provides firm cushioning that bears evenly against the operator and thus safely distributes the momentum force over a large bearing area. Such inflated cushioning 4 may be made with rubber and nylon. It yields readily to an extent. The inflated cushioning has valves to allow the cushioning to be inflated to a suitable pressure.

When a barrier is to be used by operators who are quite different in build, they may use differently shaped cushioning liners 4. Such interchangeable cushioning 4 may be fastened with snap fasteners and the like. Such individualized cushioning linings 4 are shaped to suit men and women.

The cushioning 4 bulges around the edge of the face opening formed by the shields H and F. When the chin and forehead forcibly bear against the bulges of the padding 4 on the shields H and F, the bulges flatten to an extent and spread over the edges of the viewing opening to provide lip-like padding to the edges. When the shield S is being used without a shield H, the cushioning 4 on the shield S, adjacent to the operator's neck, will also bulge over the edge of the shield in response to pressure from the neck or chin. The edge cushioning tends to eliminate the danger of the thin edges cutting the operator. The cushioning on the edges of the shields at other than the face opening and the neck will at all times bulge over the edging of the stiff shielding to shield the operator from the thin rigid edges. Sponge rubber cushioning, fiber glass cushioning and the like may be used instead of pneumatic cushioning.

The head shield H has a hinged transparent visor V. The operator can view the roadway readily from behind the visor V when the visor is in registry with the viewing opening in the head shield H. The visor V, shield H, and hood D act as a windshield and weather shield on a racing auto and the like that is not equipped with conventional shielding. The visor V is made of slightly resilient plastic, therefore it can yield slightly when it resists and deflects strong thrusts against it, including the thrusts from a buffer P, a broken steering wheel 2, a broken steering column or shaft 2a, or flying glass from the windshield. A locking band M prevents the visor V from pivoting upwardly from a thrust against its lower convex surface. The visor V creates a sheltered space to protect the vital head features during collisions. These head features include the operator's eyes, ears, nose, mouth, and jaw. When the operator wears glasses, the visor V shields the glasses, thus reducing the danger of shattering of the glasses and blinding of the operator. When there is no immediate dangerous highway condition, the operator may drive with limited safety with the visor V raised to the position Va. The position Va is indicated by a phantom or dotted outline. When the visor V is in the position Va, it is lowered quickly by spring action when the operator trips a control with a forward nudge of his forehead, or by hand. When the operator does not so trip the control, the visor control is tripped automatically when momentum forces the operator's head forwardly against the tripping means during a violent deceleration. Furthermore, the visor control is automatically tripped when the operator's head bobs forwardly against it, when the operator dozes or otherwise loses consciousness.

The operator will have the visor V raised while he is smoking, also when condensation conditions are severe, such as when the auto is warming up during cold weather. An operator may keep the visor V raised during hot weather to allow him to keep cooler. When the visor V is not in registry with the opening in the shield H during a violent collision and the visor control is not tripped in time, the operator's face is protected to a large extent by being confined in the recess of the opening in the head shield H, the forehead and chin being forced against the cushioning 4 of the shields F and H. When preferred, the operator may drive with the head shield H positioned low away from his head in the position Hd, the hood D being removed beforehand. A phantom or dotted outline indicates the position Hd. The shield H in position Hd is low enough to allow the operator to see over it to view the road ahead and to the sides. When the shield H is positioned low and there are dangerous highway conditions ahead, the controls of the shield H are tripped to allow the forces in the springs on the hinges to pivot the shield upwardly. A tripping means that is responsive to a nudge of the operator's chin or hand starts the pivoting.

The head shield H may also be raised by the action of the operator's head striking the tripping means when the head slumps into the shield, as when the operator falls asleep or otherwise loses consciousness. The shield H is held down in the position Hd by the hold-down latch E. The latch is shown in Figs. 3 and 16. A buffer P is attached to the steering wheel to act as a shield to stop a broken steering wheel 2, steering column 2a, or the like, from piercing the shields S and H and/or the operator 3 during a collision. During a collision in which the steering column 2a is pushed inwardly, the buffer P forceably raises the head shield H from the position Hd when the operator has not tripped the controls of the latch E, or the controls have jammed. The arms T are hinged to the shield S and the firewall of the auto to allow hinging action for skewing the shields S and H when a diagonal collision is likely to occur, to allow the operator to meet a thrust more directly to obtain the maximum cushioning effect and to reduce or eliminate the force factors that tend to hurl him towards a side of the vehicle. The shield S may be skewed or positioned closer to the operator in a moment with the skewing and adjusting mechanism J. The mechanism J is shown in Figs. 1 and 13. Reflex actions of the operator allow him to manipulate the controls of mechanism J and other controls on the barrier to adjust it so it can furnish the most protection against an impending collision thrust. Such reflex actions are developed when adjusting the barrier for comfort and convenience during everyday driving.

A pair of slightly yieldable safety belts B are attached to the arms T and to the operator's seat 1a to help confine the operator when diagonal collision thrusts tend to hurl him towards a side of the auto. The belts may also be fastened to a loose cushion 1b under the operator to keep him seated when he is thrown forwardly to the position shown in Fig. 2.

During a very violent collision the operator's body will slide forward until it touches the cushioning 4 on the shields S and H. The shields S and H take the momentum force of the operator's body and transmits most of it into the cushioning arms T. The remainder of the force is spent by bending and breaking the steering wheel 2, and bending the steering wheel column 2a. When the barrier so yields, the shield S engages the rim of the steering wheel 2 and bends the wheel, with the lower portion of the rim bending downwardly until it engages the top of the flange on the bottom of the shield. After that action takes place, the lower portion of the wheel 2 is pressured forwardly by the forward movement of the shield S, causing the rim to be bent into an oval shape and causing the spokes to be bent and broken. When the momentum continues to force the shield S forwardly, the shield engages the buffer P on the steering wheel column 2a and bends the column. The momentum of the heavy shields of the barrier help to bend and break the steering structure. The bending of the steering structure creates a longer path to increase the period of deceleration. The longer period allows the greater portion of the momentum to be absorbed more gradually at a lower body bearing pressure than is possible with a shorter deceleration period. When the firewall and dash board portion of the auto body 1 is being pushed inwardly by a colliding object, the momentum force of the operator's body against the barrier resists the penetration force and possibly pushes those auto body portions outwardly.

The outward pushing action is most effective after the arms T have reached the limit of their cushioning. After the arms T have absorbed the momentum, the catches C prevent the release of the forces built up in the arms T until they are manually tripped after the operator is clear of the path into which the shields rebound. Snubbers similar to that described in my U.S. Patent No. 2,827,305, may be used if preferred, rather than catches C.

The cushioning action of the arms T and the cushioning 4 on the shields H and F provide adequate cushioning for the operator's head during violent collisions, including collisions when the auto veers considerably. Since the most effective cushioning means is needed to prevent head injuries, inflated cushioning 4 is preferred for the lining in the front portions of the shields H and F, since it readily depresses to fit the shape of the contacting portion of the operator's head during a collision. It allows the head to bear uniformly to distribute the momentum force over a large area of the head, thus keeping the intensity of the bearing pressure low. The firmness of the inflated cushioning allows the force to be transmitted without much yielding of the cushioning 4. The shield H prevents the momentum of the operator's head from snapping the head forwardly too far, thus the shield eliminates some factors that cause operators to receive broken necks. The shield H may be fixed in protective position so that it does not tilt, thus maintaining the maximum protection for the head.

When the lower portion of the steering column 2a near the front axles is pushed back by an object it collides with, the upper portion of the column 2a is propelled diagonally towards the ceiling of the auto. The buffer P and the shield H tend to prevent the decapitation of the operator 3 by the propelled column 2a during such a collision action. They act by spreading the force of the propelled column 2a and by diverting the column 2a aside from the head. A shoulder guard 6 helps to divert the buffer P, thus the column 2a, so they cannot crush the operator's arm and shoulder. The offsets on the shield S that form portions of the hinges G restrain the buffer P or the broken steering wheel portions from moving sideways into the space that may be occupied by the lower portion of one of the operator's arms.

The shapes and positions of the shields S and H allow freedom of movement for the operator so he can manipulate the auto controls. The shield S is wide enough to provide a suitable bearing surface for the operator's torso during a collision without obstructing the paths for the operator's arms. The barrier is adjusted to obtain a position that allows a gap between the operator 3 and the shields S and H. Air can circulate through the gap allowing the operator to keep cool while driving during hot weather. There is space between the steering wheel 2 and the shield S to allow the operator's hands and arms to clear the wheel 2 while he is turning the wheel. The freedom of movement while steering is similar to the freedom of movement of a baseball catcher whose arms are free to move to allow him to catch a ball while he is wearing protectors which cover the front of his body.

The upper portion of the operator's body straddles the upper edge of the shield S, as his arms are extended past the side edges of the shield S. The straddling position allows the operator 3 to press and hold his body against the shield S during a collision, even when the auto veers considerably during a collision and side forces tend to throw him aside from the barrier. Side thrusts caused by veering are resisted to an extent by the friction between the operator's body and the cushioning 4 on the shields.

Automobile operators usually veer their auto just before a collision. During a collision, the operator's head is forced against the cushioning 4 of the shields H and F.

The head shield H is wide enough to provide considerable latitude in the shielding and cushioning means for the operator's head, as the head would likely veer and tilt more than the torso during a collision. The shield H is wide to allow the operator to turn his head within the confines of the shield H to make a side observation. The front opening in the head shield H is close to the operator's eyes. This allows a full range of visibility of the roadway.

Since the rear of the shields S and H are open, the operator is not confined against escaping quickly during accidents, such as accidents in which an auto burns, and accidents when autos plunge into deep rivers and the like. The operator can escape quickly since he can unbuckle a belt B, push against a post K and swing it aside, and if necessary he can also quickly uncouple an arm T and swing it aside. The arms T are shown in positions that are high enough to allow the operator's legs to slide underneath. A much shorter driver than the one shown in Fig. 1 would have his legs confined by the arms T. He could uncouple an arm T and swing it aside to create access space to allow him to enter or leave his seat. Drivers in general would uncouple an arm T to create access space in autos that are differently arranged, in which the driver's lap almost touches the steering wheel and there is not enough space under the arms T for the operator to slide his legs. The operator whose legs are confined by the arms T may lower his seat 1a or remove the cushion 1b to allow him to slide his legs under an arm T. Trucks, buses, and the like that have steering columns that are positioned more vertically than the column 2a shown in Fig. 3 may have the hinges G and arms T positioned higher in relation to the barrier S. The operators of such conveyances can readily slide their legs under the arms T that are so arranged.

The operator 3 in the arrangement shown in Fig. 1 can push his seat back when leaving an auto to allow easier access from and to the operator's seat. The operator may skew the shields or push them forwardly a little to allow more access space for leaving and taking the driving position. The operator's left foot is used to control the mechanism J for skewing and adjusting the shields laterally. When the operator foresees an accident, he can move his body against the shield S, just before the collision, to obtain a snug fit against the shield, or he can move the shields S and H back against his body. He can move the seat 1a back along with the shields S and H to increase his deceleration path or to limit the deceleration flight to bring his body to a stop before it reaches close to the hazardous steering column 2a and the dashboard.

To utilize the barrier fully, there should be leg recesses in the firewall and dashboard for space where the operator's legs can decelerate farther and safer. The front of an auto usually noses downwardly during a collision, thus tending to pivot the driver upwardly away from his seat. The shield S pivots upwardly to a limit during a collision and when traveling over rough roadways, it is restrained from bouncing excessively by the belts B, the legs K, the door bracket 5, and the wheel 2. The barrier and the wheel 2 confine the operator to limit his upward bouncing travel since his lap engages the bottom of the wheel 2 and the bottom of the shields S.

When an auto without a top is involved in a roll-over accident, the belt B may be unbuckled during the roll-over to allow the operator to escape to a sheltered position under the dash. The barrier and the operator tend to bounce in unison to an extent due to rough roadway traveling. The gap between the operator and the shields allows the operator to bounce to a different degree from that of the barrier. When excessive bouncing takes place, the operator's shoulders engage the shoulder guards 6. The confining of the operator by the barrier prevents him from rising excessively above the seat during a roll-over.

The skewing and adjusting mechanism J allows positioning of the shields to obtain considerable freedom of movement for the driver as he has freedom to lean forward or backward, also to move slightly to the right and left. The valves for skewing the shields S and H and for adjusting the shields towards the rear or forwardly may be worked in combination with motor driven oil pumps, with stand-by manual valve control for use if the motors fail.

There are factors, other than the body contact to the shields S and H, which have tendencies to hold the operator and barrier in alignment when veering. These factors include the safety belts B and the operator's bracing himself with his legs and arms as he drives, particularly the normal reflex bracing action just before a crash. The skewing mechanism J has a skewing lock which prevents objectionable skewing and swinging of the shields S and H. Most drivers veer to the right just before a collision on a two lane highway, causing a collision thrust from the front left. The thrust from the left requires the operator to slide to the right and skew or pivot the barrier to the right to position the barrier and his body so they are directed towards the collision impact point. Such a skewed position is indicated by the phantom or dotted outline SK in Fig. 5.

There is secondary cushioning padding 7 on portions of the barrier that may come in contact with the operator or an adjacent passenger during a collision. Such padding 7 is shown on the right hand side of the shield H and hood D. There is also padding 7 on both the arms T to protect the legs of the operator and the adjacent passenger. The leg pockets at the firewall should have padding 7 to protect the operator's legs during a collision. The padding 7 may be made of sponge rubber or the like.

The belts B help to restrain the arms T and the shields from rising objectionably. The posts K cushionably restrain the arms T from sagging or rising objectionably due to bouncing action caused by roadway irregularities. A post K has a shaft 8 which has a ball socket connection 9 to an arm T. A vacuum cup 10 on the bottom of the shaft 8 bears against a smooth faced pad 11, the pad 11 being cemented to the floor of the auto. The operator can kick a vacuum cup 10 near its lower rim to pinch it to break the air seal to allow the post to be swung aside to create access space to allow passage to and from the operator's seat. The flexible end connections of the posts K allow the posts to pivot.

The fabric webbing 12 of the belts B may be made of nylon and rubber to allow them to yield to an extent, since the belts must lengthen during the forward thrust of the shields. The belts also stretch when an uneven roadway causes the arms T and shields to pivot or bounce. A belt B has a fastener that allows the webbing 12 to be quickly fastened and unfastened to an arm T, as shown in Figs. 1 and 12. The belt B has a catch 13 attached to the webbing 12. The catch 13 has an inverted key-hole shaped recess. There is a shaft 14 with a round shank. The shaft 14 is welded to the arm T. An elongated rectangular cam 15 is pivotally supported by the shaft 14. A nut engages the end of the shaft 14. The recess in the top of the catch 13 slips over the narrow portion of the cam 15, then the cam 15 is turned ninety degrees to lock the belt into position. The cam 15 has a curved resilient handle 16 to allow it to be turned to fasten and unfasten the belt. The lower portion of the handle 16 forms a yoke which straddles the belt webbing 12 and locks the handle 16 to the webbing 12 and thus to the catch 13. The cam 15 and the catch 13 pivot together to maintain firm engagement when the arm T is forced forwardly as shown in Fig. 2. The operator disengages the belt fastener by pressuring the end of the handle 16 to bend it away from the webbing 12, while he is turning it and the cam 15.

The pivotal forked door bracket 5 is mounted on the inside of the door as shown in Fig. 5. Resilient rubber gripping pads 17 in the fork of the bracket 5 grip the adjacent arm T. The bracket 5 helps to support the adjacent arm T and it also restrains the barrier from bouncing excessively. The bracket 5 is resilient to allow it to yield vertically to an extent. The bracket 5 is hinged so it can swing to suit the various positions of the arm T.

The shield S has a strong stiff curved panel 18 that can greatly resist forces that tend to buckle it during a collision. The panel 18 may be made of a steel plate that has been pressed to curve it. A strong panel of plastic with fiber glass and steel reinforcing may be used if preferred. The panel 18 has a shape that tends to deflect from the steering column 2a and the steering wheel 2 that has been pushed inwardly by collision forces striking the base of the column 2a.

There is an adjustable extension panel 19 attached to the lower portion of the panel 18 to allow the shield S to be adjusted in length vertically to suit the stature of the operator. There are a series of adjusting holes in the panels 18 and 19 to fit the socket head machine screw 20. The screw 20 binds the panels together. The exposed surface of the padding 4 on the shield S is shaped to approximately conform to the shape of the front portion of the operator's torso. A stiffening plate 21 is attached to the top front portion of the panel 18. The shoulder guards 6 are welded or otherwise fastened to the panel 18.

A cushioning pad 7 is attached to the lower portion of the outside of the panel 18 adjacent to the steering wheel 2. It cushions the operator's hands when the hands rub against the front of the shield S.

The hinges G allow the arms T to be uncoupled quickly from the shield S. Offsets 18a, 18b, and 18c on the panel 18 form portions of the hinges G. The forked bracket 22 on an arm T has offsets 22a and 22b which form other portions of the hinges G. The offsets 22a and 22b have key-hole like recesses that act as catches. They are similar to a catch 13 on a belt B. A handle 23 is pivotally attached to the ring 23a with a pin 23b. The ring 23a has a rectangular opening that engages the rectangular portion of the pin 24. The pin 24 has a nut 24a. The handle 23 is pivoted downwardly to clamp the handle to the bracket 22 to keep the arm T securely locked to the shield S. The handle 23 is resilient to allow it to grip the bracket 22. The handle 23 is pivotally lifted from its position shown in Fig. 1 and turned ninety degrees to disengage the arm T from the shield S. When the handle 23 is clamped in the locked position, it causes the hinge pin 25 to remain in alignment with the offsets 22a and 22b. This positioning keeps the hinge parts engaged. The knurled adjusting ring nut 25 engages threads on the pin 24. The nut 25 is rotated to vertically adjust the shield S.

The U-shaped filters 26 are removed to allow the shield S to be adjusted lower. The slot in a filler 26 is lined with resilient rubber or the like to allow the filler to grip the pin 24. A thrust arm T has cylindrical steel tubes 27, 28, 29, and 30. These tubes telescope together. The end of the tube 27 is capped adjacent the hinge G with a tight fitting cap 31. The cap 31 may be welded to the tube and to the bracket 22. A disk 32 is press-fitted into the end of tube 28. The rim portion of the disk 32 is larger than the inside diameter of the flange on the end of tube 27. This prevents the tubes 27 and 28 from uncoupling from each other. A disk 33 is press-fitted into the tube 29. The disk 33 acts similarly to disk 32. The ends of tubes 29 and 30 that are adjacent to each other are flanged to prevent the tubes from uncoupling from each other. An end of the tube 30 is threadedly engaged to the hub-like hinge member 34. A hinge pin 35 is supported by two eye bolts 36. The eye bolts 36 are fastened to the firewall of the auto body 1 and to the structural channels 37. The channels 37 reinforce the firewall.

Springs 38, 39, and 40 are confined in the tubes of the arms T. These springs are compressed during a collision when the operator's momentum forces the shield S to transmit the collision force into the arms T. The spring 40 bears against the disk 33 and a piston 41. The piston 41 is attached to the piston rod 41a. The spring 40 encases the rod 41a. The rod 41a projects through the disk 33. There is a hole through the center of the disk 32 which allows a portion of the rod 41a to pass through the disk when the arm T telescopes under a collision thrust.

The piston 41 works in conjunction with hydraulic fluid 42. The fluid 42 is forced to flow to laterally adjust the arms T, also to create a bleeding action to cushion some of the occupant's momentum force. Each hinge 34 has attached to it a flexible hydraulic tube 43. The tubes 43 are connected to the elbows 44. Each elbow 44 has three horizontal outlets which are connected to tubes to carry the fluid 42 to a pair of pumps and to a self-closing valve 45 that is connected to a reservoir 46 which will be described in detail further on.

After a collision thrust has considerably compressed the springs 38, 39, and 40, the pressure of the springs 40 against the pistons 41 highly pressurizes the fluid 42. As shown in Fig. 23, the high fluid pressure forces the resilient valve leaf 45a to open slightly by bending outward towards the reservoir tube 46a, as indicated by a phantom or dotted outline. The slight opening allows fluid 42 to bleed out into the reservoir 46, to thus cushion the collision force. A rubber seal 45b seals the valve outlet to the reservoir 46 when the fluid pressure is low and the leaf 45a returns to a vertical closed position. When the arms T are shortened by telescoping from a thrust, the overlap of the tubes increases and makes the arms T stronger as the larger overlap increases the resistance against buckling at the overlaps.

The catches C are similar to the catches shown in my U.S. Patent No. 2,827,305. The catches C are mounted on the arms T. A grooved pin 47 is welded to the tube 27. During a collision, the pin 47 engages the teeth and notches on the resilient catch bar 48 when the shield S is pushed forward and the force telescopes the arm T. The pin 47 is caught in a notch at the limit of its movement and it is held until it is manually released. The bar 48 is twisted to allow it to bend near its connection to the hinge pin 35. A fork on the hinge 34 engages the bar 48 and keeps the bar aligned with the arm T. A grooved guard 49 is attached to the catch bar 48. The guard 49 shields the operator from the saw-like edge of the bar 48. The guard 49 is welded to the bar 48 near the pin 35. The other end of the guard is attached to the bar 48 with a resilient horse-shoe shaped tie bar 50. The catches C are positioned so they do not obstruct the operator's legs and arms. There is a ridge of padding 7 on the right arm T to the right of the catch C to protect the adjacent passenger from the whip of the bar 48. When the arms T are shortened, in telescoping, they pivot about their hinges and their skew increases. There are spring latched pawls 51 on the firewall of the auto body 1 and ratchet teeth 34a on the hinge 34 which allow the arms T to pivot inwardly towards each other about the pins 35 as the arms are telescoped. The pawls 51 and the ratchets 34a restrain the arms T from pivoting outwardly about the pins 35 except when the pawls are manually disengaged from the ratchets, thus the arms T are prevented from skewing objectionably. The ratchet teeth 34a are on the lower portion of the hinge 34 adjacent the pawl 51. The operator may retract the pawls 51 to allow him to skew the barrier to the right or left before a crash in order to take the collision thrust more directly. The operator can retract the pawls 51 then skew the shield S to either side by manually pushing it, then allowing the springs in the pawls 51 to force the pawls to engage the ratchets 34a to restrain the shield S from pivoting objectionably or swinging. The pawls 51 are retracted from the ratchets 34a by action of cables 52. The cable action is responsive to tilting action of the pedal 53 by the left foot of the operator. The pedal 53 may be rocked to tilt either end down to cause the pawls 51 to be retracted. When the foot pressure is released from the pedal 53, the springs in the pawls 51 cause the pawls to couple with the ratchets 34a and cause the pedal to return to the locked position as shown in Fig. 1.

When the auto is stopped and the operator is going to disengage an arm T from the shield S, pivot the arm outward and pivot the shield aside, he may tilt the rear of the pedal 53 down and hold it there to retract the pawls 51 and then he may rock the pedal 54 with his right foot so the rear of the pedal is forced down. The hook-shaped front portion of the pedal 54 engages the long offset on the rear of pedal 51 and keeps it from rising. The operator can then freely skew the arms T to create access space for leaving and entering the auto.

When the operator reenters the auto he swings the arms T and shields into place and couples the disengaged arm T. Then he rocks the pedal 54 forward to disengage the pedal 53. The shield S may be moved forwardly to allow more access space while leaving or entering the driver's seat, also for positioning it to suit the operator when he is driving. The operator may tilt the pedal 53 and press forward against the shield S to position the shields closer to the front of the auto. When the pedal 53 is tilted it not only retracts the pawls 51, but it also causes the pair of self closing valves 45 to open, thus allowing some of the fluid 42 to flow from the tubes 30 into the reservoir 46. The valve leaf 45a is keyed to the valve shaft 55 as shown in Fig. 23. The shaft 55 is connected to the pedal 53 with cables 56 and 57. The cables 56 and 57 are hooked together. They are unhooked when the operator prefers not to disturb the adjustment of the arms T. When the shield S is being pushed forwards but not sideways and the cables 56 and 57 are not hooked together, the operator may pull the handle 58 on the cable 56 to open the valves 45. The pedal 53 need not be depressed to retract the pawls 51, since the sloping ratchet teeth 34a cause the pawls 51 to retract when the arms T are pivoted about pins 35 towards each other. When the shield S is to be pushed to the right or left, the pedal 53 must be depressed to disengage the pawls 51. The arms T may be shortened differently by varying the amount of fluid 42 in the tubes 30. The valve leaves 45a have weak springs 45c that cause the leaves to close when the pull on cable 56 is released. When the operator positions the shield S to the rear, he may depress the pedal 53 and pull back on the shield S. The cables 56 and 57 need not be hooked together since the valves 45 open inwardly in response to the vacuum created in the tubes 43 and the tubes 30. The valve leaves 45a close automatically in response to their springs 45c when the vacuum is eliminated by the flow of fluid 42 from the reservoir 46 to the tubes 30. The valves 45 close in response to back pressure from the fluid 42 in the tubes 43 and 30. The shield S may be moved to adjust it laterally with power means if preferred. A pump 59 has a reversible motor. As shown in Fig. 13, the pump 59 is connected to the reservoir 46 and to the elbows 44 with tubes 60 and 61. If the pump 59 is to be used, the cable 56 is unhooked from the cable 57.

The pump 59 is activated in response to selective switching with the pedal 53. When the pedal 53 is tilted so its rear tilts down fully, it contacts a switch on sloping floor and causes the motor on the pump 59 to rotate and pump fluid 42 from the two tubes 30 to the reservoir 46, thus creating a vacuum in each tube 30, which causes the arms T to shorten and move the shield S forward. The pedal 53 is tilted forwardly and fully to contact another electric switch to cause the motor of the pump 59 to pump in the opposite direction and pump fluid 42 from the reservoir 46 to the tubes 30, thus forcing the arms T to lengthen and move the shield S towards the operator. The contacting end of the pedal 53 is allowed to rise slightly to break the electric circuit without allowing enough slack on the cable 52 to enable the pawls 51 to engage. The shield S can be pressured to a side if desired before releasing the pedal 53 to allow the pawls 51 to engage. The pedal 54 can grip and hold the pedal 53 only after the rear end of the pedal 54 has risen above the electric switch below it. The shield S can be skewed to an extent with a motorized reversible pump 62. Tubes 63 and 64 connect the pump 62 to the elbows 44. The pump 62 is used to force the fluid 42 from the tube 30 in one arm T to the tube 30 in the other arm T, thus shortening one arm T and lengthening the other. This skewing feature allows the right arm T to be lengthened and the left arm T to be shortened to skew the shield S so the operator has more space to slide out of his seat, and leave by the left door of the auto. The support 65 which supports the pedal 53 also supports a pedal 66. The upper portion of the pedal 66 is pivoted towards the support 65 until its end contacts an electric switch which causes the pump 62 to pump fluid 42 from the left arm T to the right arm T. When the lower end of the pedal 66 is pressured forwardly, it contacts an electric switch which causes reverse action of the pump 62. The pedal returns to its neutral position by the force of a spring on its shaft. The pedal 66 may be operated by the right foot while the left foot is operating the pedal 53. The pedal 53 is not tilted fully to switch on the motor of the pump 59 while the pump 62 is being activated unless the operator needs to operate both pumps simultaneously to position the shield S. Thus the operator has a choice of either manual or power means to laterally adjust the barrier S. The operator may pull the handle 58 to open the valves 45 if the pump 59 fails.

As shown in Fig. 1, there is a keyway slot in the side of each of the tubes 28, tubes 29, and tubes 30. A machine screw 67 in the tube 29 acts as a key in the keyway in the tube 30. Another screw 67 in the tube 28 acts as a key in the keyway in the tube 29. A machine screw-like key 68 has a handle. The key 68 is threadedly engaged to the tube 27. The key 68 projects into the keyway in the tube 28. When the operator is leaving the auto and the shield S is being supported by one arm T and a leg K, the screws 67 and 68 in the keyways prevent the shield S from pivoting downward. When a barrier is mounted in a convertible or the like, the screw-like key 68 on the right arm T may be kept disengaged while driving. When there is a roll-over accident and the operator wants to pivot the shields S and H downwardly so he can gain a prone position on the seat, he can disengage the left arm T and push to tilt the shields to the right to cause them to pivot downwardly.

The arms T may project through small pockets in the overhanging dash structure of existing autos. During a violent collision when the arms T yield and pivot inwardly considerably, they could tear the dash structure to make the holes larger.

The head shield H has a strong curved shell 69. A suitable shell 69 may be made of metal or reinforced plastic. This type of shell effectively resists impacts. The shape of the shell 69 allows the head shield H to be positioned down from the operator's head without obstructing the operator's view of the roadway. A pair of hinges 70 connect the shield H to the shield S. The pins of the hinges 70 may be removable to allow the shield H to be removed readily. Some operators would likely want to drive with the shield H removed. A shield H may be quickly removed so that another shield H of a different size may be mounted in its place.

There are strong coiled springs on the pins of the hinges 70. The springs force the shield H upwardly from the position Hd when the latch E is released. A pair of spring shoulder latches 71 are bolted to the panel 18 as shown in Fig. 14. The latches 71 engage slots in the shell 69. The slots are long enough to allow the rear of the shield H to yield sideways slightly when there is a side thrust against it from the buffer P or the steering column 2a. This side yielding allows the bottom of the shield H to bear against the collar of the panel 18. The flanged collar on the panel 18 resists front and side thrusts that tend to shear off the shield H and then the operator's head. The shell 69 stiffens the top of panel 18.

As shown in Fig. 17, there is a pivotal prop 72 mounted in front of the panel 18 below the shield H. The spring 73 tends to force the prop 72 upwardly. The prop 72 and the latches 71 restrain the shield H from pivoting forwardly from a thrust of the operator's head against it. A cable 74 is fastened to the two shoulder latches 71. The cable hangs down to the center of panel 18. A pair of guide lugs 75 are attached to the panel 18. The cable 74 is rigged around the guides 75. A cable 76 is attached to the prop 72 and to the center of the cable 74. The cable 76 is rigged around a guide 75. A handle 77 is mounted loosely on the cable 76. The operator may pivot the shield H down to the position Hd by gripping the handle 77 with his left hand and pulling it downwardly. This pulling action first pivots down the prop 72, then the pull exerts enough force on the cable 74 to unlatch the latches 71. The handle 77 is gripped so the operator maintains the downward pressure on the handle 77 while he swings the handle 77 towards the wheel 2. He then grips the wheel 2 with his finger tips while he maintains the pull on the handle 77, he grips the top of the shield H with his right hand and pulls the shield down against the resistance of the hinge springs to the position Hd where it is held by the latch E. When the handle 77 is caught and pushed upwardly by the buffer P during a collision, the cables 74 and 76 are snagged and broken against the guides, thus the latches cannot be objectionably tripped.

There is a hole in the plate 21 and a hole in the prop 72 into which a removable pin is inserted when the prop 72 is lowered to lock it into that position when the shield H is removed.

The latch E is located at the neckline as shown in Figs. 3 and 16. Fig. 16 shows details of the latch E as the parts are positioned when the shield H is in the position Hd. The latch E holds the shield H down in the position Hd until it is tripped. A latch plate 78 is pivotally mounted on the shell 69. The latch 78 engages a slot 21a in the plate 21 to lock the shield H into the position Hd. The latch plate 78 has an offset 78a that projects towards the front of the shield H. The operator may press inwardly on the outer surface of the offset 78a to trip the latch 78 to allow the springs in the hinges 70 to raise the shield H. The offset 78a can also be pressured to trip the latch 78 by a pushed in steering wheel 2 pushing against the offset 78a. This action of the wheel 2 would be most probable when the wheel does not have a buffer P attached to it. A rocker 79 is pivotally mounted to the shell 69. The rocker 79 has a pin which engages a slot in the latch plate 78. A coiled spring 80 presses against the shell 69 and the rocker 79 which causes the rocker 79 to tend to forcibly keep the latch plate 78 in the locked position. There is a long offset 79a on each side of the rocker 79. When the operator's head slumps downward and his chin or face strikes the padding 4 above the offsets 79a, he compresses the padding and forces the rocker 79 downwardly which causes the latch plate 78 to be released. The pusher 81 is pivotally connected to the rocker 79. A leaf spring 82 is riveted to the pusher 81. The spring 82 tends to force the pusher 81 against the panel 18. There is a long offset 81a on each side of the pusher 81. The operator can cause the latch plate 78 to trip by using his chin to nudge the padding 4 adjacent to offsets 81a with enough force to compress the padding 4 and force forward the pusher 81, the rocker 79 being rocked by pressure from the pusher 81. When the rocker 79 tilts it forces the latch plate 78 to disengage from the slot 21a.

The forehead shield F has a U-shaped frame 83 that is pivotally attached to the inner portions of the hinge pins 84. The frame 83 is made of strong materials, such as steel or reinforced plastic. There is a slot in the frame 83 that allows space for a plunger 85 to project through it. The plunger 85 is part of a tripping means for disengaging the latch plate 86 from engagement to the visor V when the visor is in position Va. There is a threaded knob 87 and a bolt 88 on each side of the shields H and F. These knobs 87 are turned to loosen the frame 83 so the frame may be adjusted to a different position. There are curved slots in the frame 83 which allow the frame to slide against the bolts 88. The bolts 88 have a square shank portion which engages the slots in the frame 83. The slots prevent the bolts from turning. When a knob 87 is tightened, it squeezes the frame 83 against the inner surface of the shell 69. The visor V is raised to allow the operator to grip the frame 83 to lower or raise the shield F to position it to suit the operator.

The visor V has a strong blister-like dished transparent plastic panel 89. The panel 89 has a metal edging or binding 90 to strengthen it. There are small perforations in the lower portion of the panel 89 to allow fresh air to flow through the panel. A thin elastic air deflector 91 may be attached with an adhesive to the panel 89. During cool weather the deflector 91 deflects the operator's breath away from the viewing portion of the panel 89. This prevents most of his breath from reaching the viewing portion of the panel and condensing on it. The visor V is pivotally connected to the head shield H with hinge pins 84. A pin 84 has a nut 84a and a washer 84b. The visor V is manually pivoted upwardly to the position Va, exerting the hinge springs 92 on the hinge pins 84.

A latch plate 86 holds the visor V in the position Va until the latch 86 is tripped. The latching means for the visor V is shown in Figs. 20, 21, and 22. The hinge springs 92 force the visor V down quickly when the operator trips the latch 86. The operator can nudge the bar 94 to depress the plunger 85, which trips the latch 86. A guide insert 95 is attached to the shell 69. There is a coiled spring 96 on the plunger 85. The spring forces the plunger to return after the pressure against the bar 94 has been released. The latch 86 has a beveled tip that causes the latch to retract when other than the bottom edge of the visor V is contacting and passing it. The latch 86 is pivotally mounted on the shell 69 with the pin 97. A spring 98 tends to force the latch end 86a outwardly so it projects below the edging 90 when the visor V is in the position Va. The bar 94 has a ball-socket connection to the plunger 85. The bar 94 is resilient. Therefore pressure of the operator's head against the bar 94 depresses the plunger 85. The plunger rocks the latch 86 which causes the latch to retract from under the visor V, freeing the visor so the springs 92 can force it downwardly.

The visor V is locked into position in front of the viewing opening in the head shield H by a key-like locking band M that drops into a keyway 69a on the shell 69. The keying or locking allows the visor V to resist a violent thrust against its lower convex surface without pivoting upwardly. The band M has a resilient wire core 99, whose ends are connected to a pair of springs 100. The other ends of the springs 100 are connected to the metal edging 90 near the hinge pins 84. There are short pieces of rigid tubing 101 which are loosely strung on the wire 99. A pair of end tubes 102 are strung at the ends of the wire 99. The loose joints between the tubes 101 and 102 allow the band M to be bent readily. The tubes 101 and 102 are attached to the edging 90 with U-shaped resilient wire springs 103. There is an offset projecting upwards from the end of each tube 102. The operator presses his thumbs forward against these offsets on the rear of the tubes 102 to force the band M forward so that it retracts from the keyway 69a. Then he pushes the tubes 102 upwardly to thus unlock and raise the visor V from its protective position to the position Va.

The hood D has a stiff shell 104 which has a strong shape that can resist a violent impact. The hood D stiffens the shield H. The shell 104 is attached to the shield H with four threaded fasteners 105. The fasteners 105 are turned by hand approximately one hundred and eighty degrees to engage or disengage them. The shell 104 may be made of metal or of metal and plastic; the plastic having fiber glass reinforcing imbedded in it. The rear of the hood D is open to allow easy access for the operator's head. The hood D acts as a protective head covering against the sun, rain, and the like for an occupant of a conveyance without a roof. An occupant who prefers to drive with the shield H in an upright position and with the hood D attached to it would not be able to wear a conventional broad brimmed hat. His head would be shielded so he could comfortably drive without a hat much of the time. When the operator of an auto is to drive with the shield H lowered in the position Hd, the hood D must be removed as it would otherwise block the driver's field of vision. A modified hood D may be made of transparent plastic. It is kept attached to a lowered shield H. Such a hood would not have a cushioning lining and therefore it would give limited protection. The operator can see through it. It will shield the front of the operator's head while it is lowered, thus it can act as a windshield in conveyances that are without them.

The hood D is useful to protect the head of the occupant when a vehicle is nosing downwardly during a violent collision, such as a collision when a vehicle noses down into a deep roadside ditch and rolls over. During such an accident, the barrier would likely yield and pivot upwardly to an extent from the momentum of the operator's body. The firewall would deform as the arms T would pivot upwardly breaking the steering wheel. The pivoting of the barrier would cause the hood D to strike the ceiling of the auto. The cushioning in the hood D would protect the operator's head. The hood D would help prevent the operator's body from leaving its position behind the barrier shields. Many autos have tops that generally cave in to an extent during a roll-over impact. The hood D acts in such an auto accident to protect the occupant. A hood D also helps to prevent an occupant from being thrown out of a convertible auto when the auto rolls over. The pressure on the hood D from a partially caved-in auto top could to an extent safely force the occupant down into his seat. When the barrier protected occupant of a weak topped auto or an auto without a top foresees that he is going to have a serious roll-over accident, he may quickly disengage an arm T and retract the machine screw 68 on the other arm T to allow it to pivot so the operator can lean towards the second arm T to pivot the shields S and H down to a degree. Then during the roll-over, the hood D cushions the shock as it engages the auto top or roadway and the pressure against the hood forces the occupant to a nearly prone position against the seat. This means of avoiding being crushed also helps to save an occupant who is closely adjacent on the side to which the barrier is tilted, since his body would be pivoted downwardly by its contact with the operator's body and the barrier. The cushioning 4 adjacent to the passenger will cushion him from the rigid barrier shields.

The buffer P has a round dished plate 106 that is strong and broad so that it can safely transmit the momentum thrust between the operator and the steering wheel column 2a when the wheel 2 is broken. The steering column 2a acts similarly to a military spear or pike and the buffer P acts like an ancient military shield. A semi-collapsed steel connector 107 is attached to the top of the steering wheel column 2a and to the center of the concave surface of the plate 106. The connector 107 has curved ribs connecting its ends. When the steering wheel 2 is broken during a collision, the plate 106 pivots when it strikes the shield S, the connector 107 yielding readily to allow the pivoting. The plate 106 tends to pivot until its convex surface contacts the visor V and the shield S as shown in Fig. 2. The plate 106 thus forms a bridge across the recess at the neckline to prevent a broken steering wheel part from snagging into the recesses in the shielding in front of the operator's neck. Furthermore, when the plate 106 is not centered with the shields S and H during a collision, the plate 106 tends to pivot to a side and push the operator in the opposite direction, thus shielding him from the thrust of the steering column 2a. The adjacent shoulder guard 6 prevents the plate 106 from crushing the operator's shoulder and arm. Futhermore, when the plate 106 is pivoting to a side, it tends to push the operator's arm close to his body as it moves past the body. The connector 107 acts as a yieldable cap on the end of the steering column 2a. The connector 107 reduces the tendency of the column 2a to puncture the plate 106. An auto horn button may be projected through a hole in the center of the plate 106. The convex surface and periphery of the plate 106 may be covered with cushioning material, such as sponge rubber, to cushion the impact between plate 106 and the shields S and H and/or the operator or passenger.

A pair of side arms 108 are attached to the panel 18 with ball and socket connections, as shown in Figs. 1, 2, and 9. These connections allow the arms 108 to be pivoted upwardly, also outwardly away from the operator. Shelf-like projections on the panel 18 prevent the arms 18 from pivoting downwardly. The ball and socket connections have a stiff joint that may have a small pressure spring means to prevent the arms 108 from pivoting freely. The operator uses manual effort to pivot the arms 108 to allow him to leave or enter the driving position. The arms 108 act as separators between the shield S and the seat 1a to prevent the operator from being crushed when a collision thrust forces the firewall inwardly to a large extent and the barrier S is pressured backwardly. The rear portions of the arms 108 depress the cushioning on the seat back and then engage a steel plate which is supported by strong uprights. If the force is not spent when the arms 108 engage the steel stiffening in the seats, the force could bend and break the uprights at the hole near their base to allow the seat back to yield backwardly and thus allow the force to push the operator back. The seat connections to the floor could be made to allow the seat to move backwardly from a thrust against the steel stiffening in the seat. The arms 108 offer much protection in motor cars that have a small projection from the firewall to the front of the auto, such as autos with the motor in the rear or under the operator's position. Operators of motor vehicles that have strong, long overhanging front portions would not want the arms 108 attached to the barrier. The arms 108 have a strong tubular shaft that can be unthreaded for removal from the ball-socket connection. The arms 108 are adjustable in length since they have a threaded extendable rear shaft. The rear of the arms 108 have slightly pivotal bearing plates that align to the plate in the back of the seat when they engage to provide a firm bearing. The arms 108 have a cushionable covering of sponge rubber or the like.

Sub-combinations of the barrier described would be useful, particularly when the barriers are to be used where the degree of violence of collision impacts is not too severe, or when there is a demand for barriers that are very low in cost to provide limited protection. A barrier consisting of shield S and arms T furnishes considerable protection. Other barriers may incorporate one or more of the shields and control features.

Fig. 24 shows a modification of the barrier as it may be used on conveyances, such as a motor scooter, motor bicycle, and the like. The conveyance frame 109 has one thrust arm T attached to it. The arm T is attached to the lower central portion of the shield S. The frame 109 has an oval shaped retainer 110 attached to it. The retainer prevents excessive bouncing of the shields and the arm T. The inner portion of the retainer 110 has a thick resilient liner to cushion any bouncing action. A conveyance of this type with a barrier may have a bumper 111 mounted in the front to take a collision thrust to prevent the scooter from nosing over. Barriers with a single arm T may be used on autos of the future that are likely to have a side lever for steering with power steering, rather than a present day steering wheel.

Barriers like those described previously can be used to protect occupants who are standing in moving conveyances, such as house to house milk trucks in which the operator stands while driving. The barrier shields would be positioned high enough to suit the operator when he stands.

Fig. 25 shows a modification which has a barrier mounted on a vehicle seat 112 with the seat having a pair of cushioning thrust arms T attached to it, and to the floor of the auto body 1. The shield S is attached to a pair of pivotal brackets 113 with the hinges G. The seat 112 has a steel framework 114. A pair of pins 115 pivotally support the brackets 113 to offsets on the framework 114. Coiled springs 116 and 117 allow the brackets 113 and the barrier shields to bounce to a limited degree. A pair of hinge parts 118 are attached to the floor of the auto and to the thrust arms T. The arms T are inverted from their position shown in Fig. 1. The inverted arms T have their catch bars C below, where they are less likely to cause injury to the operator during a collision. The seat 112 is shown mounted on a track to allow it to slide forward and towards the rear, also to allow it to slide sideways to skew the seat. A beam-like cross piece 119 has a U-shape cross section. The piece 119 is welded to the framework 114. A pair of rails 120 support the end portions of the piece 119. The rails 120 are shaped like the piece 119. The rails 120 are bolted to the floor of the conveyance. A pair of bolts 121 attach the piece 119 to the rails 120. The heads of the bolts 121 are confined in the piece 119 and the nuts are confined in the rails 120, thus the piece 119 can slide in any lateral direction without disengaging from the rails 120. Each arm T is pivotally attached to the framework 114 with a bolt 122.

A cross-bar 123 has a pair of bolts 124 threadedly engaged to the ends of the bar. The heads of the bolts 124 are confined in the rails 120. The bar 123 passes through slots in a pair of legs on the front portion of the seat 112, thus the front of the seat 112 is held down, the seat being free to slide along the track and skew to an extent. The bolts 121 and 124 are not tightened, thus they are free to slide when the seat 112 slides. A handle of a hinge G is lifted and pivoted to disengage a bracket 113 so the shields can be pivoted away from the operator so he can leave the driving position. The brackets 113 have cushioning padding attached to it adjacent to the operator and to outside of the bracket 113 that is adjacent to the passenger beside the operator.

The modification shown in Fig. 25 would be useful in conveyances that have steering wheels that do not allow space for the arms T as arranged in Fig. 1. This modification is useful in conveyances that have a weak firewall that would not take the thrust from a pair of arms T as positioned in Fig. 1. The brackets 113 confine the operator to a larger extent than the arrangement shown in Fig. 1. The modification shown in Fig. 25 does not obstruct the driver's arms while he is driving. This modification is more costly than the arrangement shown in Fig. 1. The seat 112 can be skewed with the means described for the arrangement shown in Fig. 1.

The modification shown in Fig. 26 has the head shield H mounted so that it may be pivoted upwardly to the position Hh. This arrangement is useful in conveyances that have a steering wheel that does not allow space enough for positioning the shield H in the position H*d*. The hood D must be removed before tilting the shield H to the position H*h*. A pair of supports 125 are attached to the upper portion of the shield S. A pair of hinges 126 are attached to the supports 125 and to the flanges on the shield H. A spring latch 127 is fastened to the plate 21. The latch 127 engages a notch in the catch plate 128. The catch plate 128 is fastened to the shield H. The arrangement shown in Fig. 26 cannot be used in present autos that have extremely low ceilings.

Thus it will be seen that I have provided an efficient and strong conveyance safety barrier which, by its shape and yieldable means, makes it possible to cushion and absorb violent collision forces and thus protect an occupant of a motor vehicle or other conveyance.

While I have illustrated and described several specific embodiments of my invention, it will be understood that these are by way of illustration only, and that various changes and modifications may be made within the contemplation of my invention and within the scope of the following claims.

I claim:

1. In a conveyance having a seat for an occupant, in combination, a conveyance steering control, a rigid torso shield interposed in spaced relationship between said steering control and said occupant, support means mounted in said conveyance for supporting said torso shield in substantially vertical position, said support means being yieldable in a forward direction of said conveyance in response to the momentum thrust of said occupant against said torso shield due to a high degree of deceleration of said conveyance, a rigid buffer plate overlying at least a portion of said steering control, said plate being mounted on said steering control, said plate acting as a buffer during a collision to blunt the rigid top portion of said steering control to increase the bearing area between said torso shield and said steering control, to thus prevent piercing of the said torso shield, yieldable force absorbing and rebound preventing means to gradually absorb said momentum thrust and thereby cushion the said occupant during deceleration of said conveyance and prevent rebound of the said occupant, said torso shield being positioned so that when it is thrust forward by the said momentum thrust of the said occupant, it harnesses said momentum thrust to act as a battering ram which engages and pushes said steering control out of its path and thereby lengthens said path to allow said occupant to be decelerated more gradually and thus more safely.

2. In a conveyance having a seat for an occupant, in combination, a shield means confronting the front of the occupant, support means mounted in said conveyance for supporting said shield means in substantially vertical position, a lower portion of said shield means being rigid and confronting at least a portion of the torso of said occupant, said shield means including bearing surface means confronting said occupant's forehead, said shield means being of a construction to allow said occupant to see therethrough, said support means being yieldable in a forward direction of said conveyance for allowing yieldable movement of the said shield means in a forward direction of said conveyance in response to the momentum thrust of said occupant against said shield means due to a high degree of deceleration of said conveyance, said bearing surface means and said lower portion being interconnected so as to move with the same lineal speed forwardly, thereby restraining the head of said occupant from tilting and being injured, said bearing surface means confronting also said occupant's chin, to prevent it from moving forward ahead of the torso and remainder of the head during deceleration, thereby preventing the head from tilting and injuring the neck, and yieldable force absorbing and rebound preventing means to gradually absorb said momentum thrust and thereby cushion said occupant during the deceleration of said conveyance and prevent rebound of said occupant.

3. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of said occupant, and an upper portion of said shield means confronting the head of said occupant, said upper portion including bearing surface means confronting the chin and forehead of said occupant, said upper portion having cushioning material on at least the portion of the said bearing surface means confronting the forehead of said occupant, said upper portion having viewing opening to permit said occupant to see therethrough, said support means being yieldable in a forward direction of said conveyance for allowing yieldable movement of said shield means in a forward direction of said conveyance in response to the momentum thrust of said occupant against said shield means due to a high degree of deceleration of said conveyance, said upper portion and said lower portion being interconnected so as to move with the same lineal speed forwardly, thereby restraining said occupant's head from tilting and being injured, and yieldable force absorbing and rebound preventing means to gradually absorb said momentum thrust and thereby cushion the said occupant during deceleration of the said conveyance and prevent rebound of said occupant.

4. In a conveyance having a seat for an occupant, in combination, a rigid shield means confronting at least a portion of the front of the torso of said occupant, support means mounted in said conveyance for supporting said shield means in substantially vertical position, said support means being yieldable in a forward direction of said conveyance for allowing yieldable movement of the said shield means in a forward direction of said conveyance in response to the momentum thrust of said occupant against said shield means due to a high degree of deceleration of said conveyance, and yieldable force absorbing and rebound preventing means to gradually absorb said momentum thrust and thereby cushion the said occupant during deceleration of the said conveyance and prevent rebound of said occupant, said support means being secured to the back of said seat, and said yieldable means being between said seat and body of said conveyance, said seat being slidably mounted longitudinally of the said conveyance.

5. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of the said occupant, and an upper portion of said shield means confronting at least a portion of the head of said occupant, said upper portion including bearing surface means confronting at least the forehead of said occupant, said upper portion having cushioning material on said bearing surface means confronting the forehead of said occupant, said shield means being of a construction to allow said occupant to see therethrough, said support means being yieldable in a forward direction of said conveyance for allowing yieldable movement of the said shield means in a forward direction of said conveyance in response to the momentum thrust of said occupant against said shield means due to a high degree of deceleration of said conveyance, and yieldable force absorbing and rebound preventing means to gradually absorb said momentum thrust and thereby cushion said occupant during deceleration of said conveyance and prevent rebound of said occupant, said support means being secured to the back of said seat, and said yieldable means being engageable with said seat and body of said conveyance, said seat being slidably mounted longitudinally of the said conveyance.

6. In a conveyance having a seat for an occupant, in combination, a rigid shield means confronting at least the upper portion of the front of said occupant, support means mounted in said conveyance for supporting said shield means, at least a portion of said shield means being pivotally mounted to permit retracting it from the position confronting said occupant, said shield means having cushioning material confronting at least the forehead of said occupant, said shield means being of a construction to permit said occupant to see therethrough beyond the said shield means, said support means being yieldable in a forward direction of said conveyance for allowing yieldable movement of the said shield means in a forward direction of said conveyance in response to the momentum thrust of said occupant against said shield means due to a high degree of deceleration of said conveyance, and yieldable force absorbing and rebound preventing means to gradually absorb said momentum thrust and thereby cushion the said occupant during deceleration of said conveyance and prevent rebound of said occupant, said support means being secured to the back of said seat, and said yieldable means being engageable with said seat and body of said conveyance, said seat being slidably mounted longitudinally of the said conveyance.

7. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of said occupant, and an upper portion of said shield means confronting the head of said occupant, said upper portion including bearing surface means confronting at least the forehead of said occupant, said upper portion having cushioning material on at least the portion of the said bearing surface means confronting the forehead of said occupant, at least a portion of said upper portion being movably mounted to allow it to be retracted from the position confronting the said occupant's head, tripping means operated by said occupant for moving said movable mounted portion into operative confronting relationship with said occupant's head, said shield means being of a construction to allow the said occupant to see therethrough, said support means being yieldable in a forward direction of said conveyance for allowing yieldable movement of the said shield means in a forward direction of said conveyance in response to the momentum thrust of the occupant against said shield means due to a high degree of deceleration of said conveyance, said upper portion and said lower portion being interconnected so as to move with the same lineal speed forwardly, thereby restraining said occupant's head from tilting and being injured, and yieldable force absorbing and rebound preventing means to gradually absorb said momentum thrust and thereby cushion said occupant during the deceleration of the said conveyance and prevent rebound of said occupant.

8. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of the said occupant, and an upper portion of said shield means confronting at least a portion of the head of said occupant, said upper portion including bearing surface means confronting at least the forehead of said occupant, said upper portion having cushioning material on at least the portion of the said bearing surface means confronting the forehead of said occupant, said shield means being of a construction to allow the said occupant to see therethrough beyond the said shield means, at least a portion of said upper portion being pivotally mounted on its lower end to a portion of said shield means for forward and downward pivotal movement away from the face of said occupant, and control means operated by forward movement of the head of said occupant for pivotally raising said pivotally mounted portion in operative confronting relationship with the head of said occupant, said support means yieldable in a forward direction of said conveyance in response to the momentum thrust of said occupant against said shield means due to sudden deceleration of said conveyance, yieldable force absorbing and rebound preventing means to gradually absorb the said momentum thrust and thereby cushion the said occupant during deceleration and prevent rebound of the said occupant.

9. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of the said occupant, and an upper portion of said shield means confronting at least a portion of the head of said occupant, said upper portion including a bearing surface means confronting the forehead of said occupant, at least said upper portion being pivotally mounted and having cushioning material on at least a portion of the said bearing surface means confronting the forehead of said occupant, said shield means being of a construction to permit said occupant to see therethrough beyond the said shield means, said pivotally mounted upper portion including locking means for locking it in the vertical position confronting the head of said occupant, tripping means operated by said occupant for automatically positioning said pivotally mounted upper portion in the vertical operating position confronting the head of said occupant, said support means being yieldable in a forward direction of said conveyance in response to the momentum thrust of said occupant against said shield means due to a high degree of deceleration of said conveyance, and yieldable force absorbing and rebound preventing means to gradually absorb said momentum thrust and thereby cushion said occupant during deceleration of said conveyance and prevent rebound of the said occupant.

10. In a conveyance having a seat for an occupant, in combination, a rigid shield means confronting the front of the said occupant, support means mounted in said conveyance for supporting said shield means in substantially vertical position, a lower portion of said shield means confronting at least a portion of the torso of the occupant, and an upper portion of said shield means confronting at least a portion of the head of said occupant, said upper portion including bearing surface means confronting at least the forehead of said occupant, said upper portion having cushioning material on the said bearing surface means confronting the forehead of said occupant, said shield means being of a construction to permit said occupant to see therethrough beyond the said shield means, said shield means including a stiff transparent eye shield selectively movable either in vertical, confronting relationship with the eyes of said occupant or in non-confronting relationship therewith, tripping means to automatically move said eye shield in a vertical position confronting the eyes of said occupant, said support means being yieldable in a forward direction of said conveyance for allowing yieldable movement of said shield means in said forward direction in response to the momentum thrust of said occupant against said shield means due to a high degree of deceleration of said conveyance, and yieldable force absorbing and rebound preventing means to gradually absorb said momentum thrust and thereby cushion the said occupant during deceleration of said conveyance and prevent rebound of the said occupant.

11. In a conveyance having a seat for an occupant, in combination, a rigid shield means confronting the front of the occupant, support means mounted in said conveyance for supporting said shield means in substantially vertical position, a lower portion of said shield means confronting at least a portion of the torso of the occupant, and an upper portion of said shield means confronting at least a portion of the head of said occupant, said upper portion including bearing surface means confronting at least the forehead of said occupant, said upper portion having cushioning material on the said bearing surface means confronting said occupant's forehead, said shield means being of a construction to permit the said occupant to see therethrough beyond the said shield means, said shield means including a movably mounted face shield means selectively movable either in vertical, confronting relationship with at least a portion of the face of said occupant or in a retracted non-confronting relationship therewith, at least a portion of said face shield means being stiff transparent material, control means in said upper portion operated by forward movement of the head of said occupant to move said face shield means from the retracted position to a confronting, operative position for protecting the face of said occupant, said support means yieldable in a forward direction of said conveyance for allowing yieldable movement of said shield means in said forward direction in response to the momentum thrust of said occupant against said shield means due to a high degree of deceleration of said conveyance, and yieldable force absorbing and rebound preventing means to gradually absorb said momentum thrust and thereby cushion the said occupant during deceleration of the said conveyance and prevent rebound of the said occupant.

12. The combination recited in claim 10 wherein said eye shield is pivotally mounted to allow angular non-confronting position when said eye shield is retracted.

13. The combination recited in claim 2 wherein at least a portion of said bearing surface confronting a portion of the face of said occupant is movably mounted so as to be selectively movable either in vertical confronting relationship with said portion of said face, or in a retracted non-confronting relationship with said portion of said face, control means operated by said occupant to move said movable portion from the retracted position to a confronting, operative position for restraining said occupant's head from tilting and breaking his neck.

14. The combination recited in claim 2 wherein at least a portion of said seat is slidably mounted and interconnected with said shield means so as to move with the same lineal speed forwardly, thereby restraining said occupant from falling to the floor of said conveyance after he has been propelled by momentum against said shield means.

15. In a conveyance having a seat for an occupant, in combination, a conveyance steering control, a rigid shield interposed in spaced relationship between said steering control and said occupant, said shield confronting at least the front of substantially the entire torso of said occupant, support means mounted in said conveyance for supporting said shield in substantially vertical position, said conveyance having a deceleration path confronting the front of said shield and said occupant, said support means being yieldable in a forward direction of said conveyance in response to momentum thrust of said occupant against said shield due to a high degree of deceleration of said conveyance, yieldable force absorbing and rebound preventing means to gradually absorb said momentum thrust and thereby cushion said occupant during deceleration of said conveyance and prevent rebound of said occupant, said support means being yieldable to an extent that is greater than the yielding distance to said steering control, whereby said shield can decelerate through the space in which the said steering control is normally positioned, said rigid shield confronting substantially the entire portion of said steering control that is in said deceleration path, said shield being positioned so that when it is thrust forward by said momentum thrust of said occupant, it harnesses said momentum thrust to act as a battering ram which engages and pushes said steering control out of said deceleration path and thereby lengthens said deceleration path to allow said occupant to be decelerated more gradually and thus more safely, said shield being strong and rigid enough to resist deformation, including piercing and bending from striking engagement with said steering control, whereby said shield can act as a ram and as a buffer between said occupant and said steering control, preventing broken portions of said steering control from injuring said occupant by impaling or crushing him.

References Cited in the file of this patent

UNITED STATES PATENTS

| | | |
|---|---|---|
| 2,322,755 | Voorhies | June 29, 1943 |
| 2,499,993 | Gregg | Mar. 7, 1950 |
| 2,717,162 | Walters | Sept. 6, 1955 |
| 2,757,040 | McLelland | July 31, 1956 |
| 2,768,003 | Apel | Oct. 23, 1956 |
| 2,781,203 | Kurilenko | Feb. 23, 1957 |
| 2,801,866 | Naslund | Aug. 6, 1957 |
| 2,815,508 | Finken | Dec. 10, 1957 |
| 2,826,788 | Graham | Mar. 18, 1958 |
| 2,827,305 | Graham | Mar. 18, 1958 |
| 2,833,554 | Ricordi | May 6, 1958 |